Sept. 20, 1960 C. W. BAUGH, JR 2,953,637
TELEVISION APPARATUS
Filed March 19, 1957 2 Sheets-Sheet 1

WITNESSES
Edwin E. Baesler
Leon J. Taga

INVENTOR
Charles W. Baugh, Jr.
BY J.J. Callahan
ATTORNEY

Sept. 20, 1960 C. W. BAUGH, JR 2,953,637

TELEVISION APPARATUS

Filed March 19, 1957 2 Sheets-Sheet 2

2,953,637
Patented Sept. 20, 1960

2,953,637

TELEVISION APPARATUS

Charles W. Baugh, Jr., Montgomery Township, Somerset County, N.J., assignor to Westinghouse Electric Corporation, East Pittsburgh, Pa., a corporation of Pennsylvania Filed Mar. 19, 1957, Ser. No. 646,991
8 Claims. (Cl. 178—5.8)

This invention relates generally to television receivers and, more particularly, to automatic frequency control systems for them.

In standard television systems, it is the practice to transmit the picture signals on one carrier wave and to transmit the complementary sound signals on an adjacent carrier wave.

In a television receiver of the type utilizing an intercarrier sound system, the picture and sound intermediate frequency signals are amplified in the same intermediate frequency amplifier, and an intercarrier sound signal is derived by heterodyning the picture and sound intermediate frequency signals. The intercarrier sound frequency corresponds to the difference between the picture and sound carrier frequencies and in standard television systems is 4.5 megacycles.

It has been the practice in the design of a television receiver of the intercarrier sound type to employ some sort of attenuation circuits to control the sound carrier level relative to the picture carrier level. These attenuation circuits, although helping to shape the overall picture intermeditae frequency response curve, are essentially provided to prevent beats in the second detector between the sound carrier and high frequency video components in a monochrome video receiver. In a single second detector type of color television receiver, an even greater attenuation is usually required at the accompanying sound carrier frequency to prevent beats between the color components and the sound carrier.

It is highly desirable that the frequency of the local oscillator in both monochrome and color television receivers be controlled in order to control the frequency of the intermediate frequency sound signal to effect adequate rejection to the accompanying sound carrier by the attenuation circuits. In the prior art, various systems utilizing conventional frequency discriminators have been proposed for providing frequency control of the sound intermediate frequency. This type of control is not entirely satisfactory since there is a tendency for a conventional frequency discriminator control to drift in frequency relative to the operating frequency of the attenuation circuit.

In a television intercarrier sound receiver, if local oscillator drift takes place, the 4.5 megacycle intercarrier sound signal remains unchanged in frequency, but the intermediate frequency sound signal may fall on a portion of the intermediate frequency response curve where the attenuation is not satisfactory. Also, if local oscillator drift allows the video intermediate frequency carrier to move from its correct position on the intermediate frequency response curve slope, proper vestigial sideband reception will not be achieved and poor picture quality will result.

In present monochrome and color television receivers, it has generally been found necessary for satisfactory sound and color-sound performance respectively to provide a fine tuning control knob on the front panel of the receiver to make a precise adjustment of the frequency of the local oscillator. In a color television receiver, the fine tuning control knob is usually required to compensate for 900 kilocycle beat between the color subcarrier and the sound carrier and to keep the color response at a satisfactory level. If the intermediate frequency sound signal is properly attenuated in the intermediate frequency stage of the receiver, then the color subcarrier, being near to the intermediate frequency sound carrier, will be highly sensitive by reason of its position near the rapidly falling portion of the frequency response characteristic of the intermediate frequency passband. Hence, fine tuning is needed to ensure that the color subcarrier lies on the correct point of the frequency response characteristic to achieve the desired transient response.

In copending application Serial No. 628,385, filed December 14, 1956 entitled "Television Apparatus," by Charles W. Baugh, Jr., and assigned to the present assignee, there is disclosed an automatic frequency control system for an intercarrier type television receiver which makes use of the level of the intercarrier sound wave to control the frequency of the local oscillator. The system disclosed in this copending application is limited in its control of local oscillator drift to approximately ±0.8 megacycles. This range of control is satisfactory for drift in the local oscillator of a very high frequency (VHF tuner), but it is highly desirable that such an automatic frequency control system have a greater control range when an ultra high frequency (UHF tuner) is used in conjunction with such a television receiver.

The present invention provides an automatic frequency control system for an intercarrier type television receiver, similar in some respects to the automatic frequency control system of the afore-mentioned application, but which includes means for increasing the range of control of local oscillator drift.

It is accordingly, an object of the present invention to provide an improved automatic frequency control system for an intercarrier type television receiver. It is another object of the present invention to provide an automatic frequency control system for an intercarrier type television receiver which makes use of the level of the intercarrier sound wave and the peak value of the video signal at the output of the second detector to effect control of the frequency of the local oscillator.

These and other objects are effected by my invention as will be apparent from the following description taken in accordance with the accompanying drawings throughout which like reference characters indicate like parts, and in which.

Figures 1, 2:
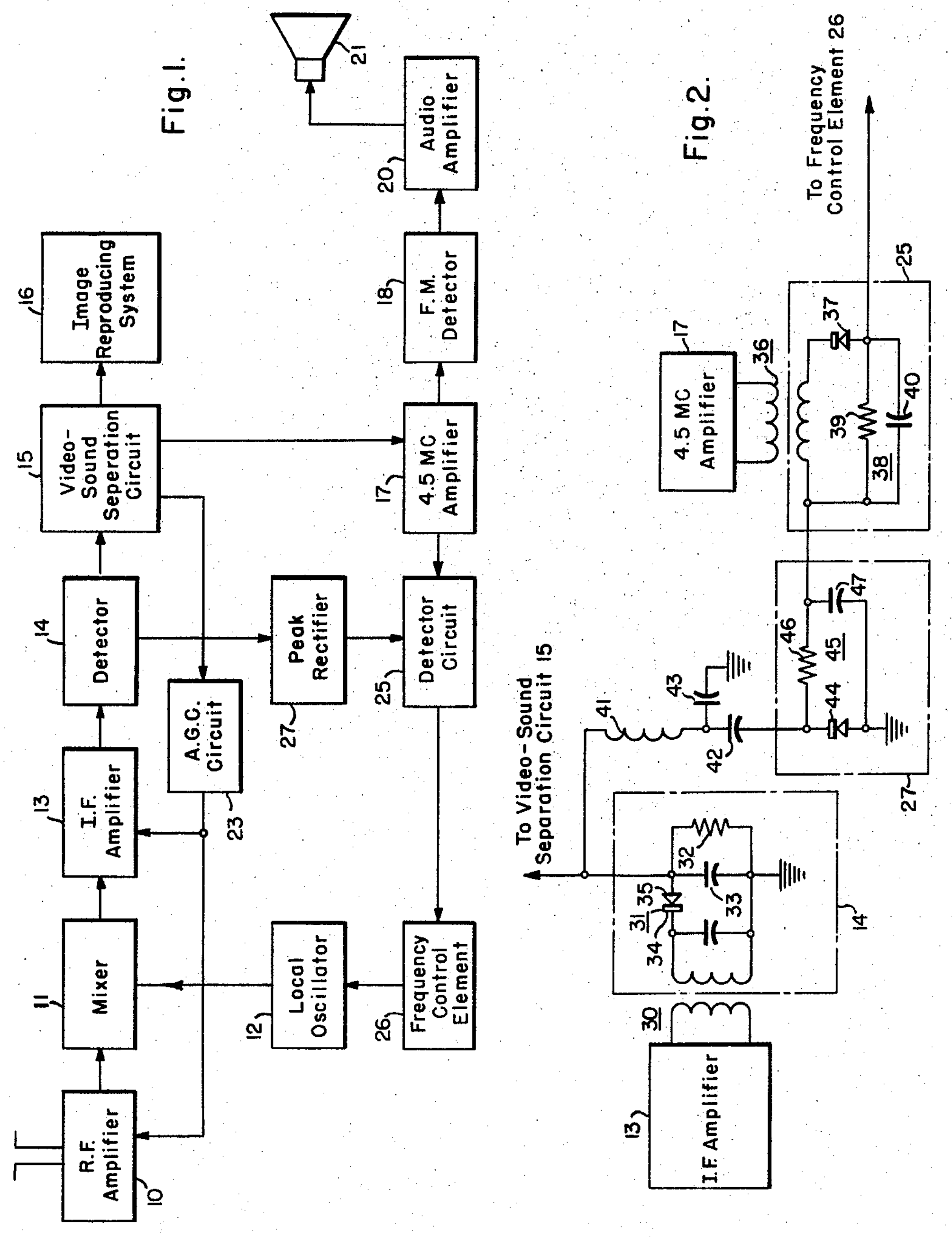
Fig. 1 is a block diagram of a television receiver embodying the automatic frequency control system of my invention.
Fig. 2 illustrates a representative form of particular portion of the television receiver of Fig. 1.

The television receiver illustrated in Fig. 1 includes a radio frequency amplifier 10 which supplies both the sound and picture radio frequency carriers to a mixer 11. In accordance with present-day standards, these carriers are separated by 4.5 megacycles. The output of a local oscillator 12 is coupled to the mixer or first detector 11 and the beat frequencies produced by the heterodyning action within the mixer 11 include the picture intermediate frequency carrier and the sound intermediate frequency carrier. The picture and sound intermediate frequencies are applied to a common intermediate frequency amplifier 13, wherein signals within a predetermined frequency range defined by the passband of the intermediate frequency amplifier are amplified. The picture and sound intermediate frequencies are applied to second detector 14 wherein the picture signals are derived from the picture intermediate frequency and the picture and sound intermediate frequency waves are heterodyned to provide an intercarrier sound wave. The video and intercarrier waves are applied to video-sound separation circuit 15 which separates the video and intercarrier sound signals. The video signals are applied to a suitable image reproducing system 16.

The intercarrier sound signal is applied to 4.5 megacycle amplifier 17 in the sound channel of the receiver wherein it is amplified. The sound channel may comprise a frequency-modulation detector 18 and an audio amplifier 20. The output of the audio amplifier is connected to a sound-reproducing device 21.

The output from the video-sound separation circuit 15 is also connected to an automatic gain control circuit 23 which acts in a well-known manner to control the amplification of the stages 10 and 13 in accordance with the intensities of received television signals.

The intercarrier sound signal from amplifier 17 is also applied to a 4.5 megacycle detector circuit 25, which may be included as a part of the frequency modulation detector 18. The detector circuit 25 produces a direct current signal, the magnitude of which varies as a function of the amplitude of the intercarrier sound signal. The output of the detector circuit 25 is applied to a frequency control element 26 which, in turn, controls the frequency of the local oscillator 12. The frequency control element 26 may comprise a diode which, in series with a condenser, is connected across the tank circuit of the oscillator 12, shunting a variable reactance across the tank and hence changing the frequency of the local oscillator. This variation of reactance is accomplished by varying the effective load applied to the diode to control its conduction.

The automatic frequency control system thus far described is disclosed and claimed in the copending application Serial No. 628,385 heretofore referred to. This automatic frequency control system utilizes the 4.5 megacycle intercarrier sound signal as it exists in the sound channel of the receiver. The intermediate frequency amplifier 13 has a desired frequency response characteristic. The level of the intercarrier sound signal is a function of the positions of the intermediate frequency video and sound modulated waves with respect to the desired frequency response characteristic of the intermediate frequency circuit. The automatic frequency control system utilizes the level of the intercarrier sound signal to produce a direct current signal whenever the intermediate frequency video and audio waves depart from predetermined positions with respect to the frequency response characteristic of the intermediate frequency amplifier 13. This direct current signal is utilized to effect control of the frequency of the local oscillator 12 to provide automatic receiver tuning so as to maintain the ratio of the picture and sound carriers substantially constant.

In accordance with the present invention, a direct current signal that is a function of the low frequency components of the video signal is applied together with the output of the detector circuit 25 to the frequency control element 26 to effect control of the local oscillator 12. Thus, in Fig. 1, the low frequency components of the video signal appearing in the output of the detector 14 are applied to a peak rectifier 27, and there is developed a direct current signal which is a measure of the peak values of these low frequency components. This direct current signal is then applied together with the output of detector circuit 25 to the frequency control element 26.

In Fig. 2, a typical schematic representation of the components illustrated by some of the blocks of Fig. 1 has been shown. It will be appreciated that this schematic diagram is given by way of example only, and that numerous variations in the circuit details may be effected without departing from the spirit of the present invention.

Referring to Fig. 2 in detail, the intermediate frequency amplifier 13 is coupled by way of transformer 30 to the second detector 14. The second detector 14 includes a germanium diode 31, or any other suitable detecting device, and has a load resistor 32 in parallel with a capacitor 33. The diode 31 has a cathode 34 and an anode 35. The cathode 35 is connected to the video-sound separation circuit 15.

The 4.5 megacycle amplifier 17 is coupled by way of transformer 36 to the detector circuit 25 which may be included as part of the frequency modulation detector 18. The detector circuit 25 comprises a germanium diode 37, or other suitable detecting device, and an RC circuit 38, the latter being comprised of a resistor 39 and a capacitor 40. The detector circuit 25 produces a direct current signal, the magnitude of which varies as a function of the amplitude of the intercarrier sound signal. The output of the detector circuit 25 is applied to the frequency control element 26.

The anode 35 of the diode 31 is also connected through an inductor 41 and a capacitor 42 to the peak detector 27. The junction of inductor 41 and capacitor 42 is connected through a capacitor 43 to a point of reference potential indicated as ground. Inductor 41 and capacitor 42 function as a low pass filter circuit to pass the low frequency components of the detected video signal to the peak detector 27. The term "low frequency components of the video signal" as used in this specification and claims will be understood to denote the composite video signal with harmonics to approximately 100 kilocycles but not including the 4.5 megacycle intercarrier sound wave.

The peak detector 27 comprises a germanium diode 44, or any other suitable detecting device, and an RC circuit 45, the latter being comprised of a resistor 46 and a capacitor 47. The circuit 45 has a time constant RC which is long compared to the time interval between the synchronizing pulse components of the composite video signal, and consequently, there is developed across the diode 44 a direct current voltage whose magnitude is a measure of the peak video voltage applied to the peak detector 27. This direct current voltage is then applied through the resistor 39 to the frequency control element 26.

Figure 3:
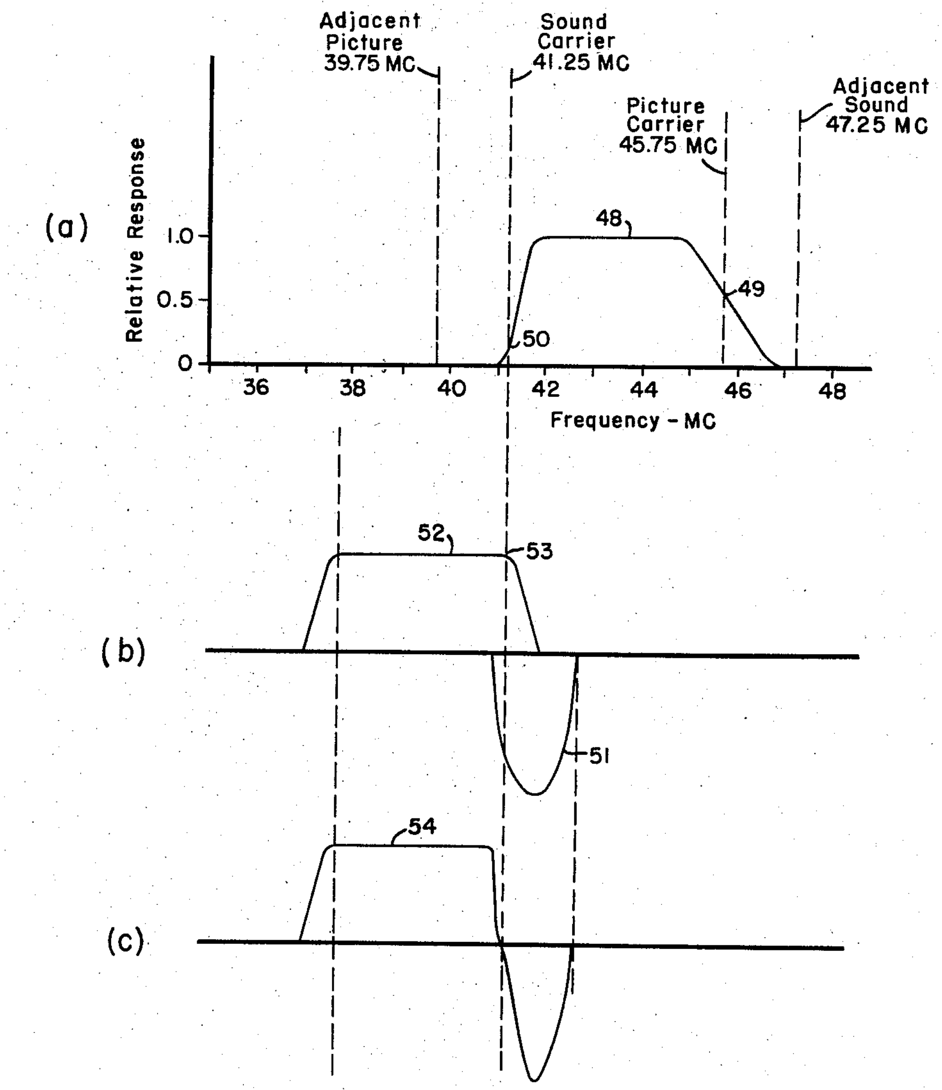
Fig. 3 shows a plurality of curves used in explaining the operation of the invention.

In Fig. 3, there is illustrated a plurality of curves which will be helpful in an understanding of the principles and operation of the automatic frequency control system of the invention. In Fig. 3*a*, there is illustrated the bandpass of a suitable intermediate frequency amplifier having a frequency response characteristic indicated by the curve 48. On curve 48, point 49 represents the video or picture carrier frequency, which is approximately 6 decibels below the maximum level, and point 50 represents the center frequency of the intermediate frequency sound signals which is attenuated by about 36 decibels below maximum level. The amplitude of the intercarrier sound wave is largely determined by the smaller of the two intermediate frequency carriers which in this case is indicated by the ordinate of point 50. The frequency response characteristic of the intermediate frequency amplifier 13 has a steep slope in the vicinity of the intermediate frequency sound carrier produced by a suitable attenuation circuit or trap.

If the positions, such as at 49 and 50, respectively, of the intermediate frequency video and sound waves are shifted with respect to the frequency response characteristic of the intermediate frequency amplifier 13, the amplitude of the intercarrier sound wave will vary. The intercarrier sound wave from the 4.5 megacycle amplifier 17 is connected to the detector circuit 25. The detector circuit 25 produces a direct current signal, the amplitude of which varies in accordance with the amplitude of the intercarrier sound wave. This direct current signal is represented by curve 51 of Fig. 3*b*. It will be seen that this direct current signal will have substantially zero values when the intermediate frequency sound wave equals 41 and 42.75 megacycles respectively, and will have a maximum value when the intermediate frequency sound wave equals approximately 42 megacycles.

In Fig. 3*b*, curve 52 represents the direct current signal appearing at the output of the peak detector 27. With the intermediate frequency picture and sound waves located at the points 49 and 50, respectively, on curve 48 of Fig. 3*a*, the level of this direct current signal will be approximately at point 53. The automatic gain control circuit 23 will control the gain of the intermediate frequency amplifier 13 to give a nominally constant value of black level. If the local oscillator 12 should drift and decrease in frequency so that the intermediate frequency sound wave moves in a direction out of the passband of the intermediate frequency amplifier 13 and the intermediate frequency picture wave moves in a direction into the passband, the level of this direct current signal will be maintained substantially uniform as the intermediate frequency picture wave moves across the passband of the intermediate frequency amplifier. Depending on the strength of the received video signal and the automatic gain control action, the effective bandwidth of the peak detected direct current signal can be as wide or wider than the 6 decibel width of the passband of the intermediate frequency amplifier 13.

In Fig. 3*c*, curve 54 is the combination of curves 51 and 52 and represents the control signal which appears at the output of the detector circuit 25. This control signal is then applied to the frequency control element 26 to effect control of the local oscillator 12.

While the invention has been shown in one embodiment, numerous modifications falling within the spirit and scope of the invention will be readily apparent to those skilled in this art after the benefit of the above teachings has been obtained.

I claim as my invention:

1. In a television receiver including an intermediate frequency channel for translation of a first intermediate frequency carrier wave which is modulated with video components including low frequency components, and a second intermediate frequency carrier wave which is modulated with sound components, said second carrier wave having a predetermined frequency separation from said first carrier wave, circuit means coupled to said channel for demodulating said first carrier wave to derive said video components including said low frequency components and for heterodyning said waves to provide an intercarrier wave having an amplitude varying as a function of the amplitude of said carrier waves, means coupled with said circuit means for producing a first control signal proportional to the peak amplitude of said low frequency components, means coupled to said circuit means for producing a second control signal varying in accordance with the amplitude of said intercarrier wave, and frequency control means coupled with said first and second signal producing means and said channel for controlling the frequencies of said carrier waves in response to said first and second control signals.

2. In a television receiver including an intermediate frequency channel for translation of a first intermediate frequency carrier wave which is amplitude-modulated with video and synchronizing components and a second intermediate frequency carrier wave which is frequency-modulated with sound components, said second carrier wave having a predetermined frequency separation from said first carrier wave, circuit means coupled to said channel for demodulating said first carrier wave to derive said video and synchronizing components and for heterodyning said waves to provide an intercarrier sound wave having an amplitude varying as a function of the amplitude of said carrier waves, means coupled with said circuit means for producing a first control signal proportional to the peak amplitude of said synchronizing components, means coupled with said circuit means for producing a second control signal varying in accordance with the amplitude of said intercarrier wave, and frequency control means coupled with said first and second signal producing means and said channel for controlling the frequencies of said carrier waves in response to said first and second control signals.

3. In a television receiver for receiving television signals consisting of a first carrier wave of a first frequency which is modulated with video and synchronizing components and a second carrier wave of a second frequency which is modulated with sound components, said second frequency having a predetermined relation to said first frequency, and in which means comprising a local oscillator is utilized for separately heterodyning said first and second carrier waves to produce correspondingly modulated first and second intermediate frequency carriers, an intermediate frequency channel for translating said carriers, circuit means coupled to said channel for demodulating said first carrier to derive said video and synchronizing components and for heterodyning said carriers to provide an intercarrier sound wave having an amplitude varying as a function of the amplitude of said carrier waves, means coupled to said circuit means for producing a first control signal proportional to the peak amplitude of said synchronizing components, means coupled to said circuit means for producing a second control signal varying in accordance with the amplitude of said intercarrier wave, and means coupled with said first and second control signal producing means for controlling the frequency of said local oscillator in response to said first and second control signals.

4. In a television receiver for receiving television signals consisting of a first carrier wave of a first frequency which is modulated with video and synchronizing components and a second carrier wave of a second frequency which is modulated with sound components, said second frequency having a predetermined relation to said first frequency, and in which the output of a local oscillator is heterodyned with said carrier waves to develop first and second intermediate frequency carrier signals respectively modulated with said video and synchronizing components, and said sound components; an intermediate frequency channel having sufficient band pass to transmit the two intermediate frequency carrier waves, circuit means coupled to said channel for demodulating said first carrier signal to derive said video and synchronizing components and for heterodyning said carrier signals to provide an intercarrier sound wave having an amplitude varying as a function of the amplitude of said carrier waves, means coupled to said circuit means for producing a first control signal proportional to the peak amplitude of said synchronizing components, automatic gain control means coupled between said circuit means and said channel for maintaining said first control signal substantially constant value when the intermediate frequency carrier signal corresponding to said first carrier wave is within the band pass of said channel, means coupled with said circuit means for producing a second control signal varying in accordance with the amplitude of said intercarrier wave, and means coupled with said first and second control signal producing means and said local oscillator for controlling the frequency of said local oscillator in response to the combined magnitudes of said first and second control signals.

5. In a television receiver for receiving television signals consisting of a first carrier wave of a first frequency which is modulated with video and synchronizing components and a second carrier wave of a second frequency which is modulated with sound components, said second frequency having a predetermined relation to said first frequency, a first detector to which said carrier waves are applied, a local oscillator, the output of said local oscillator being coupled to said first detector for converting said television signals to intermediate frequency carrier waves, a common intermediate frequency amplifier coupled to said first detector for translation of said intermediate frequency carrier waves, means including a second detector coupled to the output of said intermediate frequency amplifier to detect the intermediate frequency carrier wave corresponding to said first carrier wave to derive said video and synchronizing components therefrom and to heterodyne the intermediate frequency carrier waves to produce an intercarrier sound wave having an amplitude varying as a function of the amplitude of said intermediate frequency carrier waves, means coupled with said second detector for producing a first control signal proportional to the peak amplitude of said synchronizing components, means coupled with said second detector for producing a second control signal varying in accordance with the amplitude of said intercarrier wave, and means for controlling the frequency of said local oscillator in response to said first and second control signals.

6. In a television receiver for receiving television signals consisting of a first carrier wave of a first frequency which is amplitude-modulated with video and synchronizing components and a second carrier wave of a second frequency which is frequency-modulated with sound components, said second frequency having a predetermined relation to said first frequency, means including a local oscillator for heterodyning said carrier waves so as to develop a separate intermediate frequency carrier wave corresponding to each of said first and second carrier waves, an intermediate frequency amplifier circuit coupled to said heterodyning means for translating said intermediate frequency carrier waves, circuit means including an amplitude detector coupled with said intermediate frequency amplifier circuit so as to detect the intermediate frequency carrier wave corresponding to said first carrier wave to derive said video and synchronizing signals therefrom and so as to heterodyne the intermediate frequency carrier waves to produce an intercarrier sound wave having an amplitude varying as a function of the amplitude of said intermediate frequency carrier waves, means coupled with said circuit means for producing a first control signal proportional to the peak amplitude of said synchronizing components, means coupled with said circuit means for producing a second control signal varying in accordance with the amplitude of said intercarrier wave, and means for controlling the frequency of said local oscillator in response to the outputs of said first and second control signal producing means.

7. In a television receiver for receiving television signals consisting of a first carrier wave of a first frequency which is amplitude-modulated with video and synchronizing components and a second carrier wave of a second frequency which is frequency-modulated with sound components, said second frequency having a predetermined relation to said first frequency, means including a local oscillator for heterodyning said carrier waves so as to develop a separate intermediate frequency carrier wave corresponding to each of said first and second carrier waves, an intermediate frequency channel having sufficient band pass to transmit the two intermediate frequency carrier waves and having a predetermined frequency response characteristic, detector means coupled to said channel for demodulating the intermediate frequency carrier wave corresponding to said first carrier wave so as to derive said video and synchronizing components therefrom, and for heterodyning said intermediate frequency carrier waves when both of said intermediate frequency carrier waves are within the band pass of said channel to produce an intercarrier sound wave having an amplitude varying as a function of the amplitude of said intermediate frequency carrier waves, means coupled with said detector means for producing a first control signal proportional to the peak amplitude of said synchronizing components, means coupled with said detector means for producing a second control signal varying in accordance with the amplitude of said intercarrier wave, and means coupled with said first and second control signal producing means and said local oscillator for controlling the frequency of said local oscillator in response to the combined magnitudes of said first and second control signals.

8. In a television receiver for receiving television signals consisting of a first carrier wave of a first frequency which is amplitude-modulated with video and synchronizing components and a second carrier wave of a second frequency which is frequency-modulated with sound components, said second frequency having a predetermined relation to said first frequency, means including a local oscillator for heterodyning said carrier waves so as to develop a separate intermediate frequency carrier wave corresponding to each of said first and second carrier waves, an intermediate frequency channel having sufficient band pass to transmit the two intermediate frequency waves and having a frequency response characteristic such that the frequency-modulated intermediate frequency carrier wave is transmitted at an amplitude less than the amplitude of the amplitude-modulated intermediate frequency carrier wave when said intermediate frequency waves are located at predetermined positions with respect to said frequency response characteristic, with said predetermined positions being controlled by the frequency output of said local oscillator, detector means coupled to said channel for demodulating said amplitude-modulated intermediate frequency carrier wave so as to derive said video and synchronizing components therefrom and for heterodyning said intermediate frequency carrier waves when both of said intermediate frequency carrier waves are within the band pass of said channel to produce an intercarrier sound wave having an amplitude varying as a function of the amplitude of said intermediate frequency carrier waves, means coupled with said detector means for producing a first control signal which varies as a function of the peak amplitude of said synchronizing components, means coupled with said detector means for producing a second control signal varying in accordance with the amplitude of said intercarrier wave, and means coupled with said first and second control signal producing means and said local oscillator for controlling the frequency of said local oscillator in response to the combined magnitudes of said first and second control signals.

References Cited in the file of this patent

UNITED STATES PATENTS

| | | |
|---|---|---|
| 2,664,464 | Cotsworth | Dec. 29, 1953 |
| 2,714,132 | Fredendall | July 26, 1955 |

FOREIGN PATENTS

| | | |
|---|---|---|
| 905,377 | Germany | Mar. 1, 1954 |